United States Patent
Hood et al.

[11] Patent Number: 5,306,547
[45] Date of Patent: Apr. 26, 1994

[54] LOW TRANSMISSION HEAT-REFLECTIVE GLAZING MATERIALS

[75] Inventors: Thomas G. Hood, San Francisco; Stephen F. Meyer, Los Gatos, both of Calif.

[73] Assignee: Southwall Technologies Inc., Palo Alto, Calif.

[21] Appl. No.: 628,893

[22] Filed: Dec. 14, 1990

[51] Int. Cl.⁵ .............. B32B 7/02; E06B 3/24
[52] U.S. Cl. .................. 428/213; 428/34; 428/333; 428/432; 428/433; 428/434; 428/458; 428/469; 428/472; 428/689; 428/699; 428/701; 428/702; 52/788; 52/789; 359/360; 359/589
[58] Field of Search .......... 428/34, 262, 213, 432, 428/433, 434, 458, 469, 472, 689, 699, 702, 333, 701; 52/788, 789; 156/107, 109; 427/165, 166, 419.2, 419.3; 359/360, 589

[56] References Cited

U.S. PATENT DOCUMENTS

| | | | |
|---|---|---|---|
| 3,962,488 | 6/1976 | Gillary | 427/109 |
| 4,017,661 | 4/1977 | Gillary | 428/412 |
| 4,166,876 | 9/1979 | Chiba et al. | 428/215 |
| 4,179,181 | 12/1979 | Chang | 350/1.7 |
| 4,308,316 | 12/1981 | Gordon | 428/336 |
| 4,320,169 | 3/1982 | Yatabe | 428/412 |
| 4,337,990 | 7/1982 | Fan | 350/1.7 |
| 4,565,719 | 1/1986 | Phillips et al. | 428/457 |
| 4,590,118 | 5/1986 | Yatabe | 428/461 |
| 5,059,458 | 10/1991 | Goodall | 428/212 |

FOREIGN PATENT DOCUMENTS

63-239042 10/1988 Japan.

Primary Examiner—Donald J. Loney
Attorney, Agent, or Firm—Morrison & Foerster

[57] ABSTRACT

High-performance heat-reflective films having a metallic silver layer bounded by two dielectric layers are disclosed. The thickness of the layers is selected to insure high levels of heat rejection but relatively high levels of light transmission together with a substantial level of color neutrality.

21 Claims, 8 Drawing Sheets

LOW TRANSMISSION HEAT-REFLECTIVE GLAZING MATERIALS

BACKGROUND OF THE INVENTION

1. Field of the Invention

This invention relates to heat-reflective window-glazing materials More particularly, it relates to heat-reflective window-glazing materials with very high heat rejection properties and relatively low visible light transmission properties.

2. Background Information

In energy-conscious architecture, windows pose a special dilemma Designers are asked to incorporate a maximum of window area into their plans notwithstanding the fact that window surfaces are major sources of energy control loss. In cold climates, added internal heat is lost through window surfaces. In warm climates, exterior heat enters through window surfaces, thus increasing air conditioning loads.

Historically, storm windows and multipane glazing have been employed to enhance window energy performance. More recently, the addition of a variety of films, coatings and glass compositions have been brought into use to achieve the same ends.

There is presently a call for window-glazing products having higher energy (heat) control performance (This performance property is often quantified as "shading coefficient" as will be defined below.) There are a number of approaches to enhanced energy control performance. One is to absorb the energy into the glazing material such as by bronzing or greying it and increasing its energy-absorbing ability. Another is to reflect the energy with reflective coatings or films. Each of these methods has its shortcomings. In the case of relying upon energy absorption, one has the problem that the absorbed energy is stored in the glazing material and a portion of it is radiated and convected across the glazing material, thus defeating in part the desired heat control When solar absorption is the mechanism, at low shading coefficients the degree of absorption required is so high that heat treated glass must be used. These materials must be able to withstand the amounts of heat stored in the glazing and their attendant temperature rises. Tempered glass and heat-strengthened glass are used to avoid fractures. These materials are more costly and can greatly prolong manufacturing lead times to market. In the case of relying upon energy reflection, it is difficult to achieve large degrees of energy reflection without also significantly degrading the performance of the glazing product in the visible spectrum This results in unwanted selective transmission and reflection of some visual wavelengths and thus a "tinting" of the transmitted light and/or reflected light and difficulties with batch-to-batch and intrabatch consistency as far as color properties are concerned. In addition, conventional reflective products are also marked by high absorption due to the type of coating used (i.e., titanium and stainless steel). These mirror-like glass products can be aesthetically unattractive when used with the required tempered glass due to nonplanarity in the glass.

Since the early 1980s, Southwall Technologies, Inc. has marketed a series of window thermal control film products under the trademark Heat Mirror. These products are plastic films having dielectric-metal-dielectric induced transmission energy filters on their surfaces. These products have been tailored to fill the need for substantial heat control while permitting transmission of a substantial amount (i.e., greater than 40% and often nearly 90%) of visible light While these products have met with customer acceptance, they have typically been used in settings where their high light transmissions have been desired rather than in settings where maximal heat rejection has been required. Their design has been such as to optimize visible light transmission.

Others have looked to low emissivity or "low E" coated glass glazings to reduce heat loss. These products have typically employed a partially transparent metal coating as heat control agent and optionally rely on heat reflectors or absorbers on or in the glass as a solar control mechanism. Emissivity refers to the heat emitting (or radiating) propensity of a surface. Emissivity is expressed as an emissivity number with a perfect blackbody radiator having a value of 1, window glass having a value of about 0.84 and glass with a low E coating having a value well below that, approximately 0.15. However, when low shading coefficients are needed, low E coatings have been used with tinting of the glass which has different low E property and results in increases in emissivity with attendant radiant heat losses. Even then, shading coefficients of low E glass are found to be greater than 0.35.

It is a general object of this invention to provide heat-reflective film products having a dielectric-metal-dielectric induced transmission structure but which are capable of high levels of heat rejection (low shading coefficient) while maintaining acceptable color properties throughout the visible wavelengths. It is a further object to achieve this in a product having a low emissivity.

STATEMENT OF THE INVENTION

We have now found an improved structure for heat-reflective composite films. These composite films find application in heat-reflective insulating glazing materials. These glazing materials have a transparent substrate having a surface and the composite film on the surface. The composite film is made up of a single transparent metal layer with the metal being metallic silver or predominantly metallic silver. This metal layer is from about 270Å to 400Å in thickness It is disposed between two discrete layers of transparent dielectric defined as an underlayer and a top layer. The underlayer is located between the substrate and the metal layer. The dielectric is a material, usually a metal oxide, that is visually transparent and that has an index of refraction at 550 nm ranging from 1.75 to 2.50. A different dielectric both can be used for each layer or one dielectric can be used for both layers. The optical thickness of the dielectric top layer is selected in the range of from 950Å to 1800Å. The physical thickness of the dielectric underlayer is at least about 30Å. The thickness of the dielectric layers and the metal layer are related. These layers are selected within the above-described ranges so as to yield a composite film having a total transmission of available solar energy in the visible wavelengths of 380–750 nm of less than about 40% and a reflection of solar energy in all wavelengths of at least about 50%. The dielectric layers and metal layer are also selected within this range so that transmitted and reflective color neutrality is achieved. The level of color neutrality is defined such that the maximum transmission at any wavelength between 400 nm and 700 nm is not greater than 1.7 times the minimum transmission at any wavelength within that range. Similarly, the maximum reflection at any wavelength in that range should be not greater than 1.7 times the minimum reflection at any wavelength within that range. A product meeting the criteria can also be defined as having L*a*b* color space coordinates such that Ta*, Tb*, Ra* and Rb* each have absolute values less than about 6.

In another aspect, this invention provides the above-described glazing material in which the transparent substrate is a flexible transparent plastic sheet with the composite film having been laid down upon it by sputter depositing.

In another aspect, the substrate may be rigid glass or plastic.

The heat-reflective insulating glazing material provided by this invention may be employed in a wide variety of glazing structures. It may, for example, be suspended parallel to and between a pair of parallel panes of rigid glazing so as to give a triple-pane construction. Also, a plastic sheet-based material may be laminated to a rigid glazing sheet. In addition, of course, if the substrate itself is a rigid material, like glass, the glazing material may be used as produced as a single-pane glazing or as part of a multi-pane structure.

In additional embodiments, the transparent substrate may be tinted a color such as bronze or gray for increased shading coefficient.

DETAILED DESCRIPTION OF THE INVENTION

Brief Description of the Drawings

This invention will be described in detail below with reference being made to the accompanying drawings in which.

DESCRIPTION OF PREFERRED EMBODIMENTS

Definitions

As used in this specification and the appended claims, the following terms have defined meanings:

"Visible radiation" or "light" means electromagnetic radiation having a wavelength of from 380 nm to 750 nm. (CIE Standard)

"Infrared radiation" or "heat" means electromagnetic radiation having a wavelength above 750 nm.

"Transparent" means having the property of transmitting visible radiation unless otherwise stated.

"Tvis" or "Tv" or "transmittance visible" each refer to a measure of transmittance over the visible wavelength. It is an integrated term covering the area under the transmittance vs. wavelength curve throughout the visible wavelengths. (1931 CIE Illuminant C Standard).

"Tsol" or "Ts" or "transmittance solar" each refer to a measure of transmittance over all solar energy wavelengths. (ASTM E 424A) It is an integrated term covering the area under the transmittance vs. wavelength curve for both visible and infrared wavelengths. In heat-reflective films and glazings incorporating them, it is a primary goal to decrease Tsol while maintaining Tvis as high as possible.

"Tmax(400–700)" refers to the maximum measured transmittance occurring at any wavelength between 400 and 700 nm. Conversely, "Tmin(400–700)" refers to the minimum transmittance measured at any wavelength between 400 and 700 nm.

"Rmax(400–700)" refers to the maximum measured reflectance occurring at any wavelength between 400 and 700 nm. Conversely, "Rmin(400–700)" refers to the minimum reflectance measured at any wavelength between 400 and 700 nm.

"Index of refraction" is defined to mean the index of refraction of a material in the visible region, in this case determined at the most sensitive wavelength for the human eye, 550 nm.

"Optical thickness" or "OT" is a dimension in angstroms for transparent layers which takes into account the index of refraction of the material making up the layer. OT=physical thickness x index of refraction.

Figure 10:
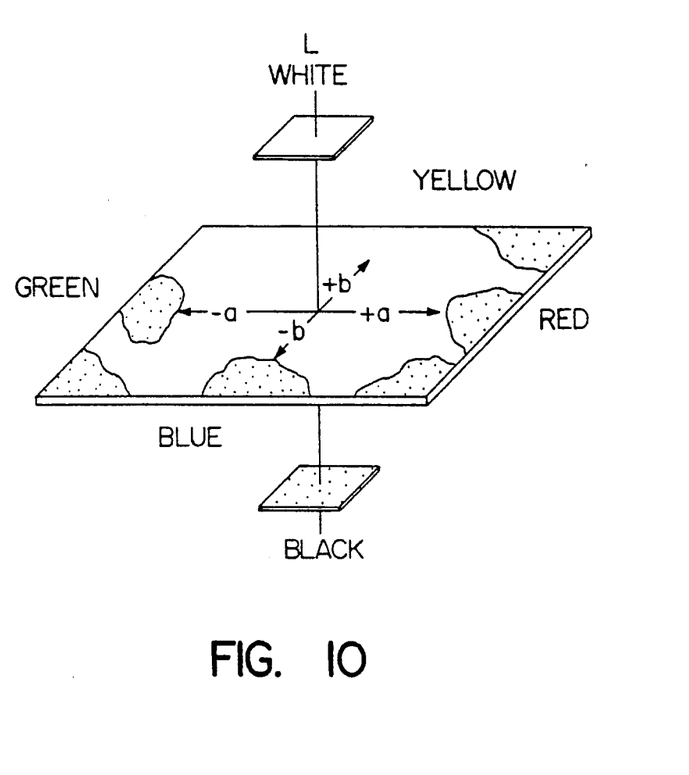
FIG. 10 is an illustration of the L*a*b* color space used to define color coordinates and thus quantify color for transmitted or reflected light.

"Color coordinate" is a reference to a particular location in the L*a*b* color space. The L*a*b* color space is a CIE-accepted and widely used system for quantifying the color properties of reflected or transmitted light. FIG. 10 is an illustration of the Lab color space which shows that when a* and b* are 0, light has no color tint but that when a* and/or b* move away from 0 this notes coloration of the light. Ta*, Tb*, Rn* or Rb* are values for a* and b* for transmitted and reflected light, respectively.

"SC" or "shading coefficient" is an accepted term in the field of architecture. It relates the heat gain obtained when an environment is exposed to solar radiation through a given area of opening or glazing to the heat gain obtained through the same area of ⅛-inch thick single-pane clear glass. (ASHRAE Standard Calculation Method) The clear glass is assigned a value of 1.00. An SC value below 1.00 indicates better heat rejection than single-pane clear glass. A value above 1.00 would be worse than the baseline clear single pane.

"Transparent silver layer" is a coherent metallic layer composed of silver, but optionally being composed predominantly of silver and containing up to about 25% by weight total of one or more metals selected from gold, platinum, palladium, aluminum, copper and nickel.

"Transparent dielectric layer" is a coherent layer of transparent metal oxide or metal sulfide having an index of refraction of 1.75 to 2.50 at 550 nm.

Description of Insulating Glazing Material

The present invention involves heat-reflective insulating glazing materials. A basic embodiment of this material is shown as 10 in FIG. 1. Glazing material 10 includes a multilayer induced transmission composite film 12 adhered to the surface of transparent substrate 14. Filter 12 is an induced transmission filter which includes a single transparent silver layer 16 bound by two boundary layers 18 and 20. Layers 18 and 20 are made of dielectric.

Figure 1:
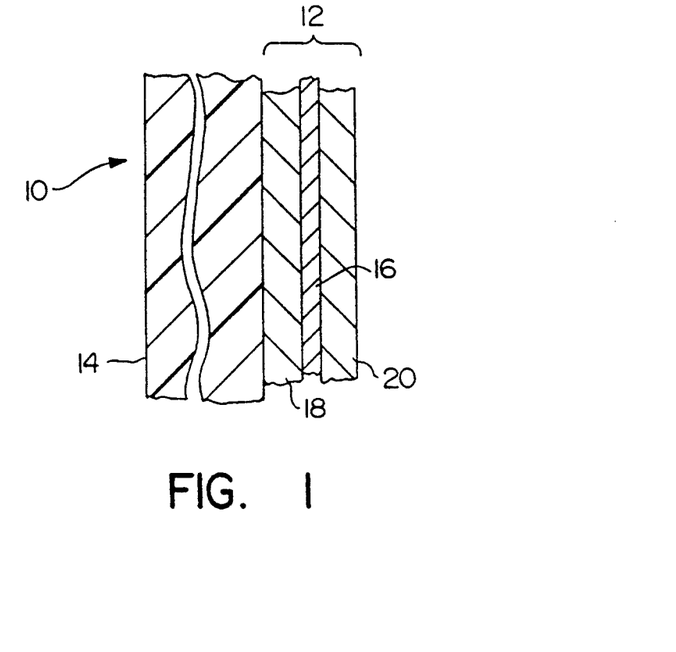
FIG. 1 is an expanded-scale cross-sectional view of a representative heat-reflective glazing material of the invention.

In glazing material 10, transparent support 14 can be a flexible plastic sheet, say 0.5 to 15 mils thick, formed from materials such as polyester, polyimide, polycarbonate, polypropylene, polyethylene or polyarylate. Polyesters and especially polyethylene terephthalate are preferred plastic substrates. The substrate can also be a sheet of more rigid glazing material, say up to about ⅛ inch thick, such as rigid plastic, for example polyacrylic or polycarbonate plastic, or it can be glass, such as float glass or the like. Substrate 14 is typically clear but can, if desired, be tinted a dark color such as gray or bronze so as to increase its light absorption and the overall shading coefficient that the glazing material which incorporates it can achieve.

Induced transmission composite film 12 contains a central metal layer made up primarily or preferably entirely of metallic silver This layer has a thickness in the range of from about 270Å to about 400Å. The exact thickness is selected according to parameters to be described in detail below. The silver layer is bound on both sides by layers of dielectric. The two dielectric layers may be the same or different. They are each made of materials having a high index of refraction, particularly an index of refraction of from about 1.75 to about 2.50.

Representative materials for use as the dielectric layers in the composite film are inorganic metal oxides, particularly, tin oxide, indium oxide, titanium oxide, zinc oxide, bismuth oxide, tantalum oxide and mixed oxides including these materials and the like. Non-oxides, such as zinc sulfide, are also useful. Indium oxide is a preferred dielectric material.

The underlayer of dielectric serves as a nucleation layer for the silver layer in addition to having an effect on the optics of the composite film. As such, the underlayer should have a physical thickness of at least 30Å and can be as thick as 1000Å or more, if desired. More commonly, the underlayer is from about 300Å to 1000Å in thickness. Often it is about equal in thickness to the top layer.

Figure 8:
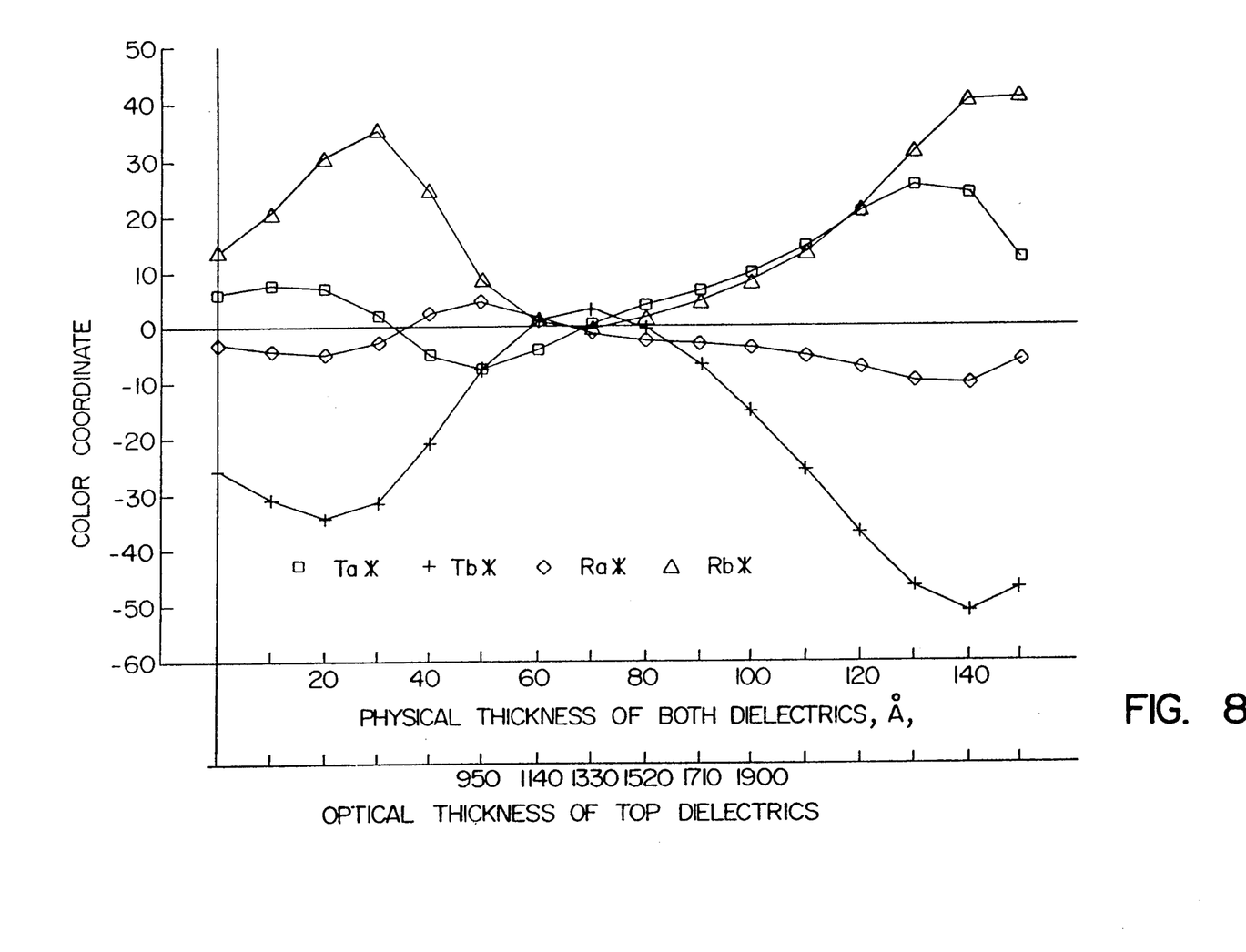
FIG. 8 is a graph of a* and b* color coordinates for transmitted and reflected light obtained practicing the present invention as well as coordinates obtained moving outside of the structure of this invention.

The thickness of the top layer of dielectric plays a critical role in determining the color properties of a composite film of this invention. The optical thickness of the top layer should be from about 950Å to about 1800Å, with optical thicknesses of from about 950Å to 1600Å being preferred. FIG. 8 illustrates the desirable color properties allowed when this top layer thickness is employed.

These optical thicknesses for the top dielectric convert to physical thicknesses of 500Å to about 950Å for the preferred dielectric $InO_2$ which has a refractive index of about 1.9.

The actual thicknesses of the silver and dielectric layers are selected so as to achieve color neutrality as defined by measuring the transmittance and reflectance values for the film as a function of wavelength and/or by measuring a* and b* values for transmitted and reflected light The thicknesses of the layers are selected so that Tmax(400–700) is not greater than 1.7 times Tmin(400–700) and such that Rmax(400–700) is not greater than 1.7 times Rmin(400–700). These layers are also selected so as to achieve a material having Ta*, Tb*, Ra* and Rb*s with absolute values less than 6 and a Tvis of less than 40% and an Rsol of at least about 50%. These values are achieved, for example, with silver layers ranging in thickness from about 375Å to about 290Å and bounded on each side by indium oxide layers ranging from about 550Å to about 600Å in thickness.

The metal layer present in this filter is a continuous coherent metal layer. Typically, this layer is put down using a sputter deposit process. Similarly, the dielectric layers are continuous coherent layers. They too are generally formed by sputter depositing.

In FIG. 1, the two dielectric layers are depicted as of equal thickness. This is not a requirement of the present invention, but is generally preferred.

Figure 2:
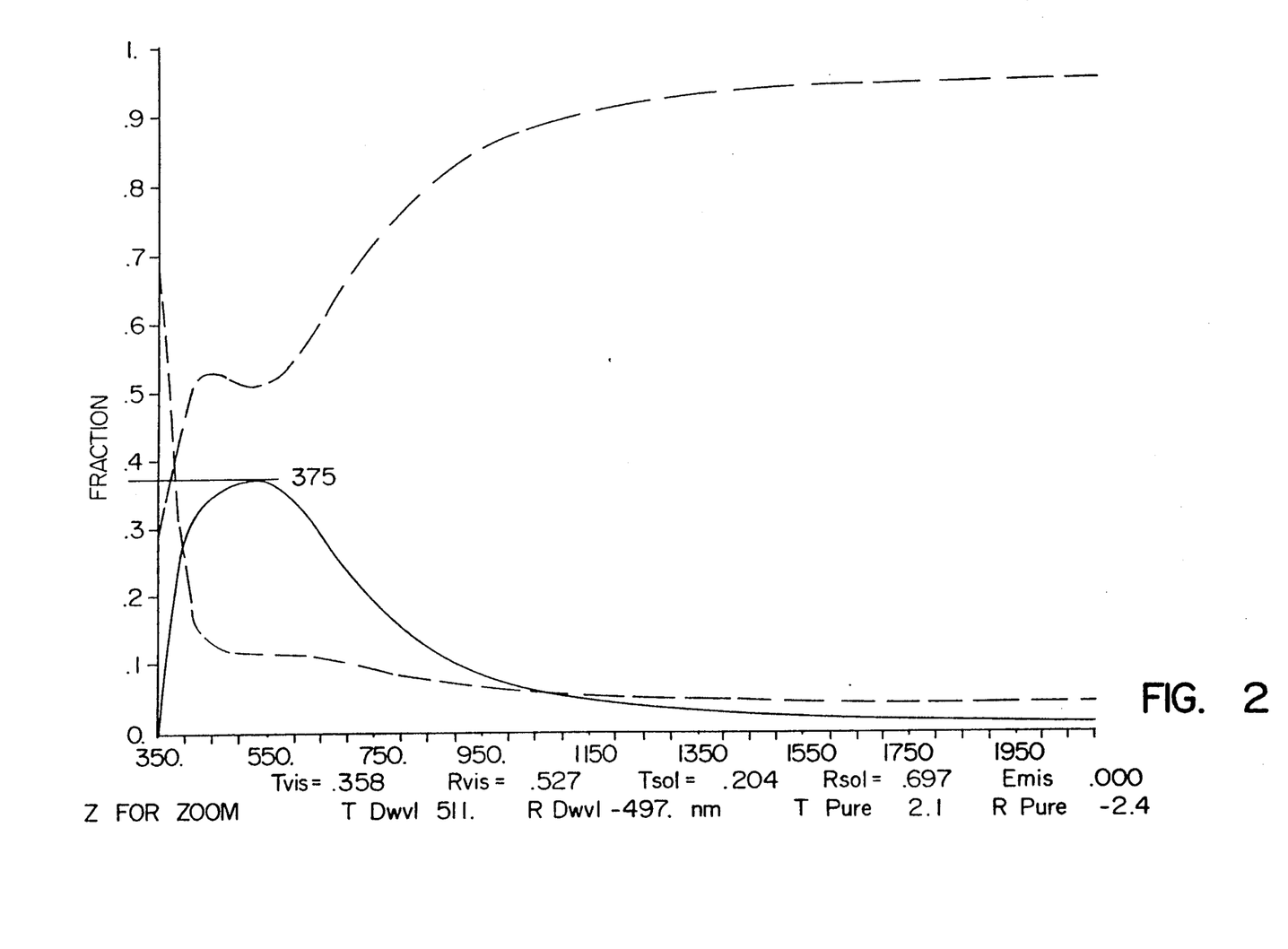
FIG. 2 is a graph of transmission and reflectance as a function of wavelength for a representative heat-reflective film of this invention.
Figure 3:
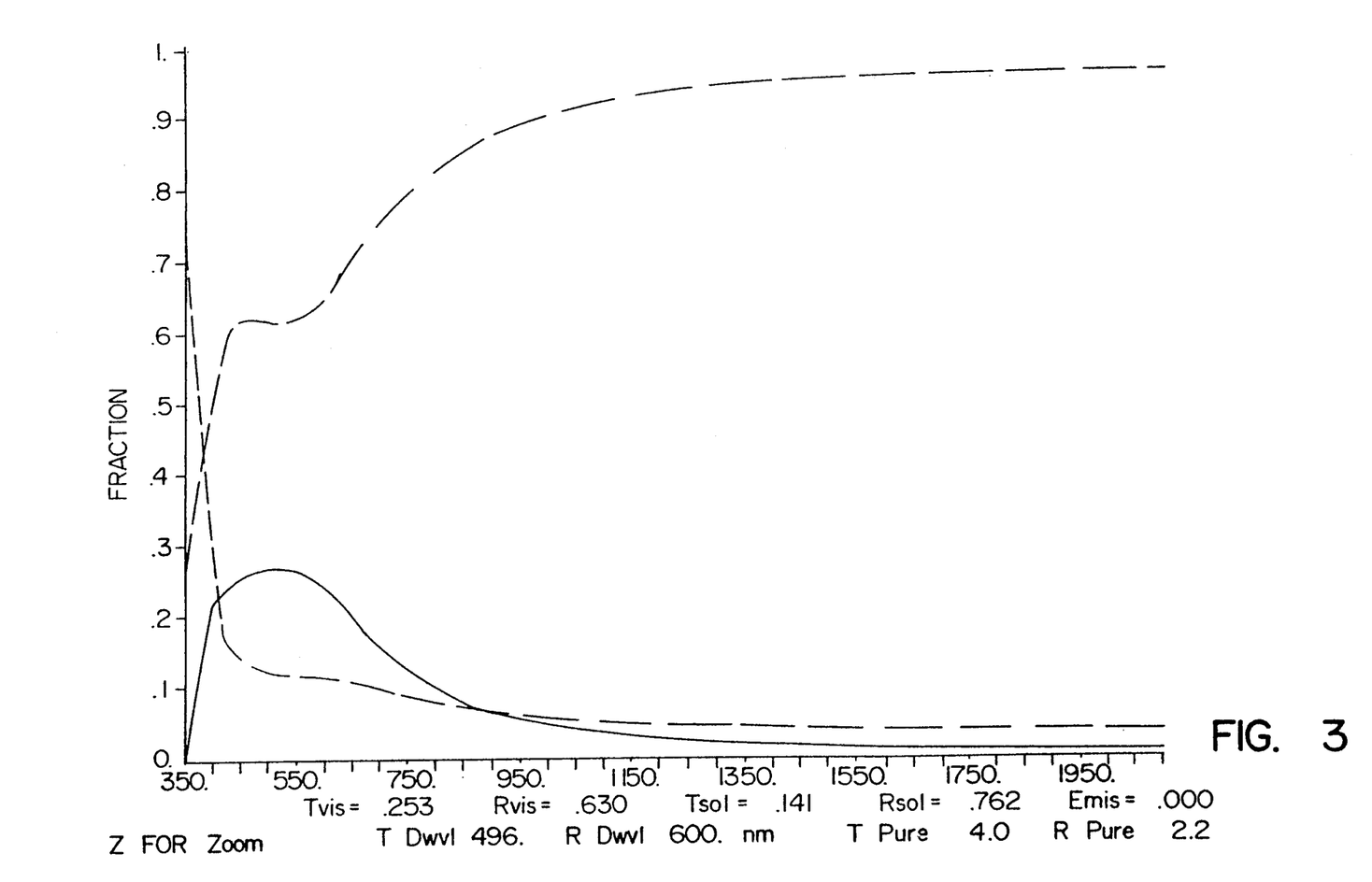
FIG. 3 is a graph of transmission and reflectance for another heat-reflective film of this invention.

The desired optical properties of representative materials of this invention can be seen in FIGS. 2 and 3. FIG. 2 details the optical performance and properties of a material of this invention having a Tvis value of about 36%, an Rsol value of about 70% and excellent optical color properties. These are reflected by a very broad transmittance peak ranging between 400Å and 700Å and a reflectance curve which is relatively flat over this wavelength region as well. This material, which is described in more detail in Example 1, has a Tmax(400–700)/Tmin(400–700) of 1.5 and an Rmax(400–700)/Rmin(400–700) which also equals about 1.5. FIG. 3 illustrates the optical properties of another material of the invention having a Tvis of about 25% and an Rsol of about 76%. This material has a Tmax(400–700)/Tmin(400–700) of 1.6 and an Rmax(400–700)/Rmin(400–700) of about 1.5. The production of this material is detailed in Example 2.

While these two materials are representative, other materials having layers within the ranges recited which meet the criteria of the invention may also be employed.

Figure 4:
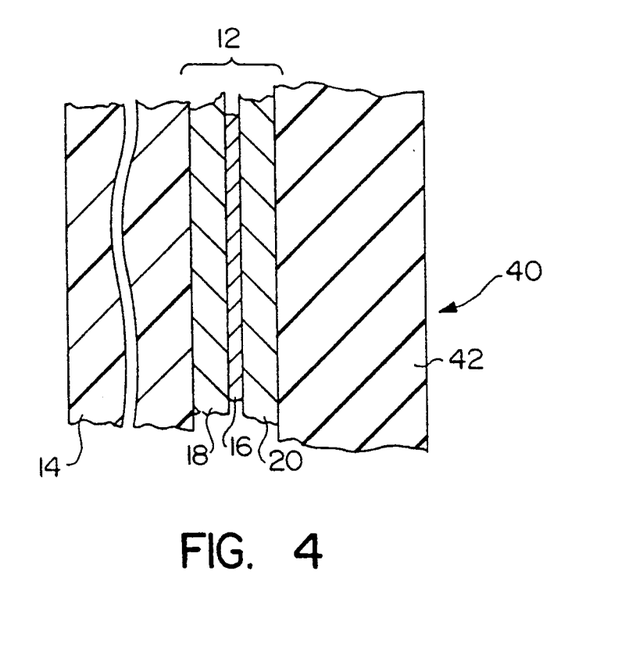
FIG. 4 is an expanded-scale cross-sectional view of another window-glazing material which includes a heat-reflective film of this invention.

Turning to FIG. 4, glazing material 40 is there shown. Material 40 includes substrate 14 with filter 12 made up of layers 16, 18 and 20 adhered to one surface. An additional layer is applied over filter 12. This is layer 42, which can be a hard coat, such as an epoxy, acrylic, modified acrylic or silicon hard coat. The function of the hard coat is to protect the relatively fragile filter 12 from chemical and physical attack by the environment of use. In this form, one could envision substrate 14 being a sheet of architectural glazing, an automotive glazing, or the like with hard coat 42 applied over the top of filter 12.

Figure 5:
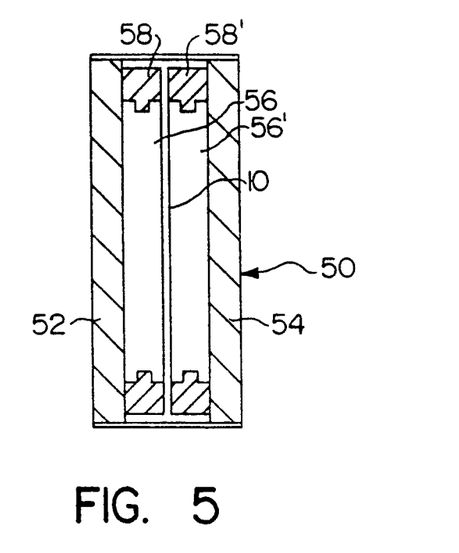
FIG. 5 is a cross-sectional view of a triple-pane glazing structure in which a flexible substrate of heat-reflective material of the invention is suspended between two parallel glass panes.

Turning to FIG. 5, yet another embodiment 50 is shown. Window unit 50 contains a sheet of glazing material 10 stretched under tension between plastic or glass pane 52 and 54. 56 and 56' are air voids, and 58 and 58' are representative spacer plugs for holding the film in proper position and properly under tension. This general window structure in which the present filters may be used and the materials and methods of its manufacture are shown in U.S. Pat. No. 4,335,166, which is incorporated herein by reference.

Figure 6:
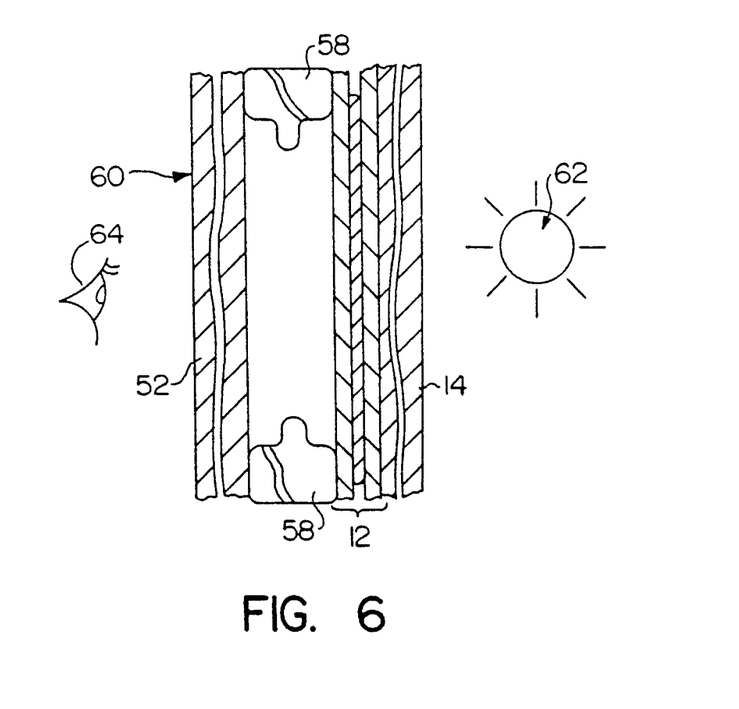
FIG. 6 is a cross-sectional view of a double-pane glazing structure employing the present invention.

In FIG. 6 an additional embodiment 60 of this invention is shown. In embodiment 60 the filter 12 is applied on one surface of glass substrate 14. Glass substrate 14 is joined to parallel glass pane 52 via spacer plugs 58 and 58' thereby forming a double-pane glazing unit 60. In FIG. 6, the preferred relative placement of filter 12 on pane 14 is shown with reference to the outdoor environment of sun 62 and inside environment of eye 64. Filter film 12 is on the outside surface of the innermost panes. This is representative of the preferred arrangement in which the filter is as far "outside" as possible thus leading to the "earliest possible" reflection of heat and minimizing heat build-up in the glazing structure. Of course, in theory an even better heat reflection and even lower heat absorption could be attained by placing the filter on the "outside" of the "outside" pane. This is generally a problem because of durability. In the case of a structure as shown in FIG. 5, it is generally best to place the filter at the "outside" of sheet 10.

Methods of Preparation

The glazing materials of this invention are prepared by laying down a composite film made up of a metallic silver layer bound on each side by a dielectric layer over a substrate. Preferably, the metal layer is laid down using magnetron sputtering. This technique can also be used to lay down the dielectric layers if they are of the inorganic oxide type which is preferred. Other preparation methods such as vapor deposition and chemical deposition can be used, as well.

The sputtering technique and apparatus suitable for carrying out the production of the present materials are both described in detail in U.S. Pat. No. 4,204,942, which, for brevity, is incorporated herein by reference.

EXAMPLES 1 AND 2

A glazing material of this invention structured as shown in FIG. 1 as 10, is prepared in a magnetron sputterer. This first material is prepared having a silver thickness of 310-315Å and dielectric layers which are indium oxide of 565-575Å thickness. Preparation conditions are as follows:

A roll of polyester film (PET), 2-mil in thickness, 74" wide by 5,000 feet long (made by Hoechst-Celanese under the product description A4-4400) is loaded into a vacuum chamber containing 5 DC magnetron sputtering cathodes and a DC glow discharge pre-glow. The cathode targets consist of the following materials in sequential order: indium, indium, silver, indium and indium. A vacuum is pulled to $1 \times 10^{-5}$ mtorr and power is supplied to the pre-glow and the 5 cathodes. The sputtering gas is argon, and additionally oxygen is used in all indium targets such that $In_2O_3$, indium oxide, is the resulting metal-oxide thin film. Power levels to the various indium targets are adjusted to the 38-48 kw levels and the silver target is set at approximately 15 kw. Line speeds, gas flows, and power levels are adjusted to ensure the thickness levels necessary to meet the optical requirements, specifically the Tvis and the color. An on line optical monitor measures the resultant thin film at 3 distinct cross-web points reporting transmission and reflection values from 350 to 2100 nm wavelengths. These actual measured data points are used to calculate the thin film parameters required to reach such performance values.

This material "A" has the optical properties shown in FIG. 2. The substrate is polyethylene terephthalate of 2 mils thickness. Similar results are obtained when the substrate thickness varies between about 0.5 mils and about 5.0 mils.

This preparation is repeated varying the power and line speed of the magnetron sputterer as follows so as to achieve a material having a silver thickness of 360-370Å and an indium oxide thickness for each of the two dielectric layers of 575-585Å. This material "B" had the spectral properties shown in FIG. 3.

Figure 9:
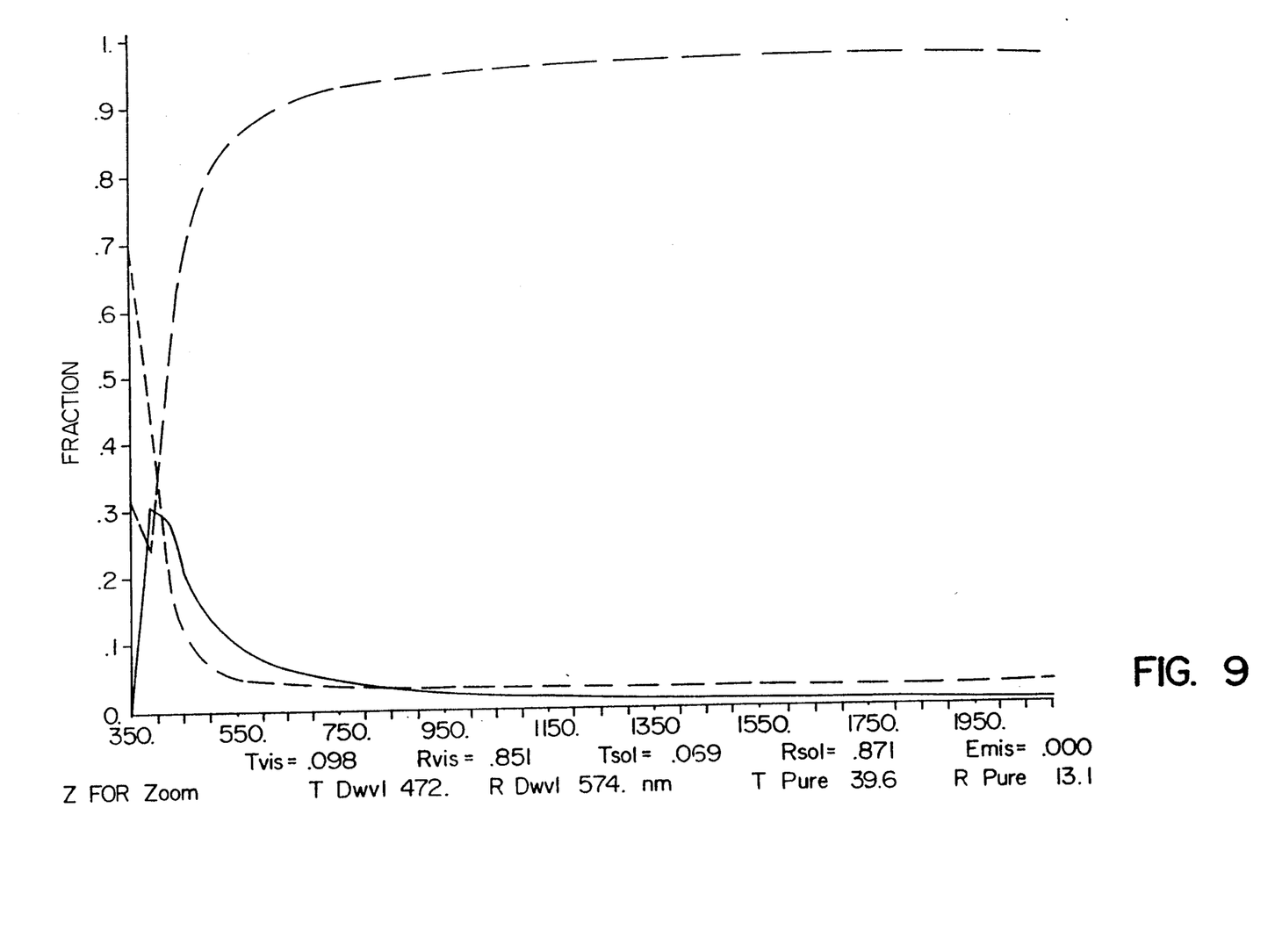
FIG. 9 is a graph of reflectance and transmission for a layer of silver alone without the added dielectric layers.

For comparison purposes, a material is produced having the same 360-370Å silver thickness, but without the bounding top or bottom indium oxide layers. This material has a spectral property shown in comparative FIG. 9. As can be seen, this material has a Tvis value of less than 10% and an Rsol value of about 90%. However, this material is not at all color neutral, having a Tmax(400-700)/ Tmin(400-700) of about 6 and an Rmas(400-700)/Rmin(400-700) of about 4.

Figure 7:
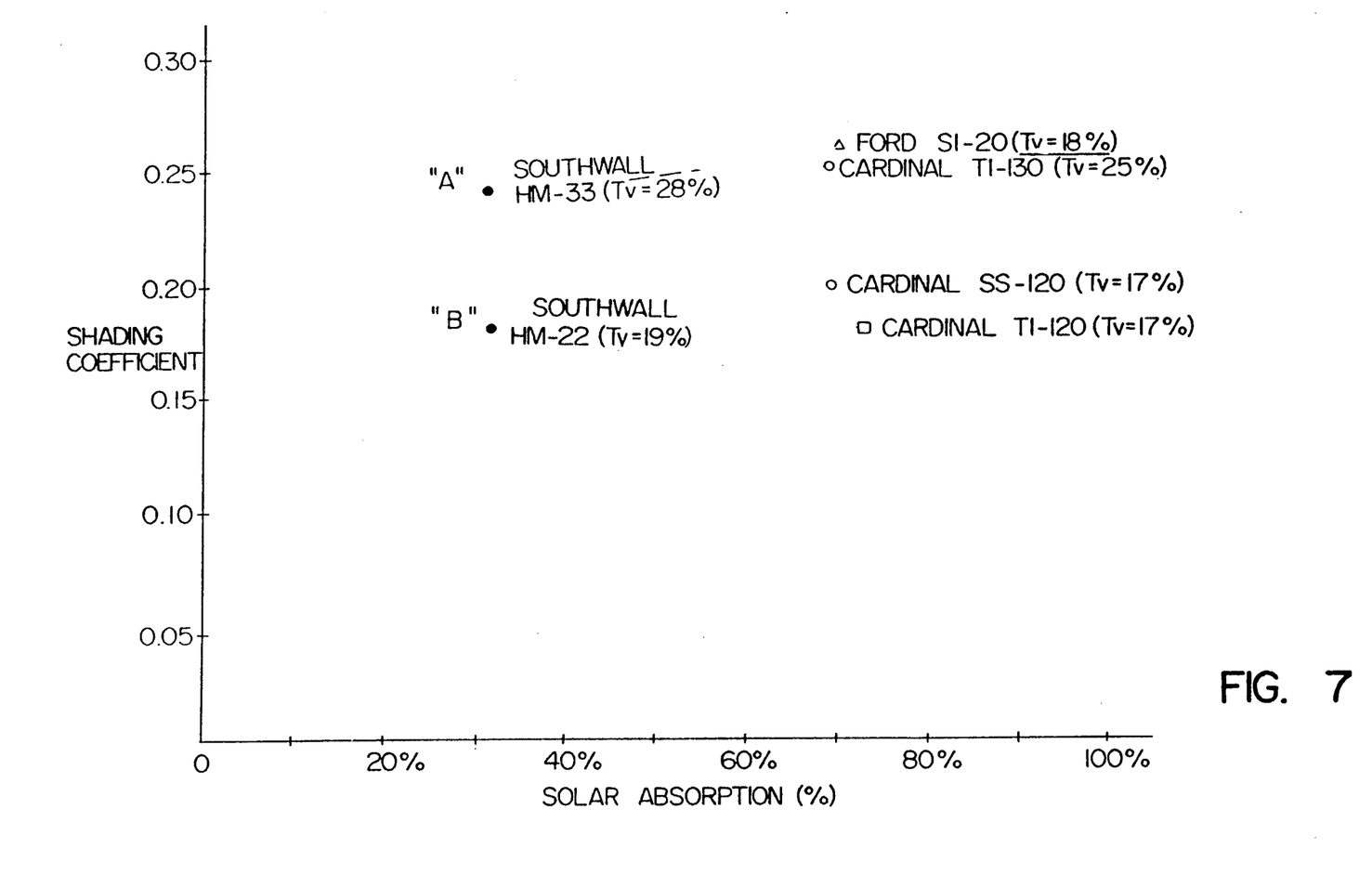
FIG. 7 is a graph plotting the low levels of solar absorption observed with coatings of this invention as compared with glazings of the art at two constant shading coefficients.

Also for comparison, the shading coefficient obtained for materials "A" and "B" are compared with four prior products as a function of solar absorption. This comparison is given in FIG. 7 which makes clear that the present materials achieve desired low shading with vastly lower solar absorption values (36% vs. about 70%).

Also for comparison, the optical a* and b* color properties of material B are determined when the optical thickness of the top dielectric is varied within and outside the thickness ranges of this invention These results are shown in FIG. 8.

Although this invention has been described with reference to certain preferred embodiments, these are not to be construed as limitations upon the invention's scope which is defined by the following claims.

What is claimed is:

1. A heat-reflective glazing material comprising a transparent substrate having a surface and a composite film on the surface, the composite film having a single discrete layer consisting essentially of metallic silver of from 270Å to 400Å in thickness disposed between two discrete layers of transparent dielectric, one a bottom layer located between the substrate and the silver layer and the other a top layer located on top of the silver layer, the bottom layer being at least about 30Å in physical thickness and the top layer having an index of refraction at 550 nm of 1.75 to 2.50 and being from 950Å to 1800Å in optical thickness, the thickness of the dielectric layers being selected so as to yield a composite film having a total transmission of available solar energy in the visible wavelengths of 380-750 nm of less than 40% and a reflection of solar energy in all wavelengths of at least about 50% and a transmitted and reflected color neutrality such that the maximum transmission at any wavelength between 400Å and 700Å (Tmax(400-700)) is not greater than 1.7 times the minimum transmission at any wavelength between 400Å and 700Å (Tmin(400-700)) and the maximum reflectance at any wavelength between 400Å and 700Å (Rmax(400-700)) is not greater than 1.7 times the minimum reflectance at any wavelength between 400Å and 700Å (Rmin(400-700)), and absolute values for each of L*a*b* color space coordinates, Ta*, Tb*, Ra* and Rb* of less than 6.

2. The glazing material of claim 1 wherein the three layers of the composite film are each a sputter-deposited layer.

3. The glazing material of claim 2 wherein the substrate is glass.

4. A high performance double-pane window glazing comprising two panes of glass held in parallel spaced apart relationship thereby defining an inside pane and outside pane and an internal cavity wherein the outside pane is the glazing material of claim 3 with the composite film facing into the cavity.

5. The glazing material of claim 3 having an interior and an exterior surface and a composite film on the interior surface.

6. The glazing material of claim 3 having an interior and an exterior surface and a composite film on the exterior surface.

7. The glazing material of claim 2 wherein the substrate is plastic sheet.

8. A high performance double-pane window glazing comprising two panes of glass held in parallel spaced apart relationship thereby defining an inside pane and outside pane and an internal cavity wherein the outside pane is a sheet of glass having the glazing material of claim 7 laminated to the side facing into the cavity.

9. The glazing material of claim 7 held in parallel separation between two spaced-apart sheets of glass, thereby creating a triple-sheet glazing structure.

10. The glazing material of claim 7 laminated to a glass sheet.

11. The glazing material of claim 1 additionally comprising a protective layer of hardcoat deposited over the composite layer.

12. A solar sheet control glazing material comprising a sheet of clear float glass from about $\frac{1}{8}$ inch thick through about $\frac{1}{4}$ inch thick and having an outer solar-impacting surface and an inner surface having sputter-deposited on its inner surface a three-layer composite heat-reflective sputter-deposited film made up of a 290Å to 380Å thick layer consisting essentially of silver deposited between a 30Å to 1000Å which transparent dielectric underlayer and a 500Å to 950Å which top layer of transparent dielectric having an index of refraction of from 1.75 to 2.50 and an optical thickness of from 950Å to 1800Å.

13. The glazing material of claim 12 wherein the dielectric for both the underlayer and the top layer is a metal oxide.

14. The glazing material of claim 13 wherein the dielectric for both the underlayer and the top layer is $InO_2$.

15. The glazing material of claim 14 wherein the silver layer is about 310–315Å thick and the two $InO_2$ layers are each about 565–575Å thick.

16. The glazing material of claim 14 wherein the silver layer is about 360–370Å thick and the two $InO_2$ layers are each about 575–585Å thick.

17. A heat-control glazing material comprising a flexible poly(ethylene terephthalate) film of from 0.5 to 3 mils in thickness having sputter-deposited on one of its surfaces a three-layer composite heat-reflective sputter-deposited film made up of a 290Å-to-380Å-thick layer consisting essentially of silver deposited between a 30Å to 1000Å thick transparent dielectric underlayer and a 500Å-to-950Å-thick top layer of transparent dielectric having an index of refraction of from 1.75 to 2.50 and an optical thickness of from 950Å to 1800Å.

18. The glazing material of claim 17 wherein the dielectric for both the underlayer and the top layer is a metal oxide.

19. The glazing material of claim 18 wherein the dielectric for both the underlayer and the top layer is $InO_2$.

20. The glazing material of claim 19 wherein the silver layer is about 310–315Å thick and the two $InO_2$ layers are each about 565–575Å thick.

21. The glazing material of claim 19 wherein the silver layer is about 360–370Å thick and the two $InO_2$ layers are each about 575–585Å thick.

* * * * *